(12) United States Patent
Lu

(10) Patent No.: US 7,616,189 B2
(45) Date of Patent: Nov. 10, 2009

(54) OPTICAL MOUSE LIGHT EMITTER

(75) Inventor: Shu-Feng Lu, Taipei (TW)

(73) Assignee: Pacer Technology Co., Ltd., Taipei (TW)

( * ) Notice: Subject to any disclaimer, the term of this patent is extended or adjusted under 35 U.S.C. 154(b) by 696 days.

(21) Appl. No.: 11/033,141

(22) Filed: Jan. 12, 2005

(65) Prior Publication Data

US 2006/0152492 A1 Jul. 13, 2006

(51) Int. Cl.
*G09G 5/08* (2006.01)
(52) U.S. Cl. .................. 345/166; 345/156; 345/163
(58) Field of Classification Search .......... 345/166, 345/156, 163
See application file for complete search history.

(56) References Cited

U.S. PATENT DOCUMENTS

2004/0212593 A1* 10/2004 Wang et al. ................ 345/166
2005/0007346 A1* 1/2005 Ma et al. ................... 345/166
2005/0100288 A1* 5/2005 Chu ............................ 385/88

* cited by examiner

Primary Examiner—Richard Hjerpe
Assistant Examiner—Leonid Shapiro
(74) Attorney, Agent, or Firm—Rosenberg, Klein & Lee

(57) ABSTRACT

An optical mouse light emitter has a transparent body, a divergent light-emitting component and a disc reflective structure. The transparent body has a front end surface and a lateral circular surface. The light-emitting component is built in the transparent body. The disc reflective structure is built on the lateral circular surface. The disc reflective structure has an internal surface. The light emitted from the light-emitting component through the front end surface of the transparent body forms a light collection area. The light emitted from the light-emitting component to the internal surface of the disc reflective structure is reflected by the internal surface to form an axial parallel light and focused at the light collection area for reducing the light interference and enhancing the illumination so as to improve the light sensing effect of the optical mouse, lower its cost and reduce its electric power consumption.

4 Claims, 10 Drawing Sheets

OPTICAL MOUSE LIGHT EMITTER

BACKGROUND OF THE INVENTION

1. Field of the Invention

The present invention relates to an optical mouse light emitter, and more particularly to a light emitter of an optical mouse that converges the light beams of its divergent light-emitting component into even parallel light beams.

2. Description of Related Art

A mouse is one of the necessary computer peripherals capable of moving a cursor freely on a screen. A rolling ball mouse has a ball situated in a base thereof, a circuit unit and a plurality of rollers disposed therein. As the rolling ball mouse is moved on a flat surface of a desk, the ball rolls on the surface to move the rollers, so that the circuit unit can compute the moving direction and displacement of the rolling ball mouse. However, the rolling ball picks up the dirt and dust on a surface easily, which will affect the mouse cursor movement. Therefore, a non-contact optical mouse that applies the optical sensing theory was introduced. An optical mouse has a light-emitting component, an optical mechanism, a sensor and a circuit unit therein. As the optical mouse is moved on a flat surface of a desk, light from the light-emitting component passes through a part of the optical mechanism and is focused on the flat surface of a desk. The light is diffused by the flat surface of a desk and reflected to another part of the optical mechanism, such that the light is focused at the sensor and the circuit unit can compute the moving direction and displacement of the optical mouse.

Reference is made to FIG. 1 of a prior-art optical mouse light emitter, which comprises a transparent body 4 and a divergent light-emitting component 5. The transparent body 4 has a front end surface 40 and a lateral circular surface 42. The light-emitting component 5 is disposed in the transparent body 4. The light L1 emitted from the light-emitting component 5 through the front end surface 40 of the transparent body 4 forms a light collection area A, and the light L2 emitted from the light-emitting component 5 through the lateral circular surface 42 of the transparent body 4 is diffused outside the light collection area A. In the foregoing prior-art optical mouse light emitter, the light L1 passing through the light collection area A and the light L2 diffused outside the light collection area A cannot form an even parallel light beam as the optical mouse is moved on a flat surface of a desk. The light of the light-emitting component 5 passing through a part of the optical mechanism of the optical mouse is focused at the flat surface of a desk, and the light is diffused by the flat surface and reflected to another part of the optical mechanism, such that the light is focused at the sensor of the optical mouse and the circuit unit of the optical mouse can compute the moving direction and displacement of the optical mouse. However, if the light passing through a part of the optical mechanism is focused at the flat surface of a desk, a light interference phenomenon will occur to produce uneven illumination and form bright rings and dark rings alternatingly aligned, which phenomenon is know as the airy disc.

Reference is made to FIG. 2. A point P originally falls in the region of a bright ring B. As the optical mouse is moved, the bright ring B and the dark ring D move accordingly, such that the point P falls in the region of a dark ring D. As a result, an unstable potential will be produced after the sensor receives the light, and that will cause a poor optical sensing effect or the optical mouse cursor cannot be moved smoothly on the screen. Furthermore, the light L2 emitted from the light-emitting component 5 through the lateral circular surface 42 of the transparent body 4 cannot be used. Illumination thereof is thus very low, which results in a poor optical sensing effect and a waste of the electric power consumption to the optical mouse.

In another prior-art optical mouse, the light-emitting component adopts a laser component instead of the foregoing divergent light-emitting component. Although the laser component does not have the light diffusion problem of the foregoing divergent light-emitting component, it is too expensive.

SUMMARY OF THE INVENTION

Therefore, it is a primary objective of the present invention to provide an optical mouse light emitter, in which the light of the divergent light-emitting component is collected and converted into an even parallel light beam for reducing the light interference and improving the illumination so as to enhance the light sensing effect and reduce the cost and power consumption of the optical mouse.

To achieve the foregoing objective, the present invention provides an optical mouse light emitter comprising a transparent body, a divergent light-emitting component and a disc reflective structure. The transparent body includes a front end surface and a lateral circular surface. The light-emitting component is built in the transparent body. The disc reflective structure is built on the lateral circular surface of the transparent body. The disc reflective structure has an internal surface facing the lateral circular surface and the front end of the transparent body. The light emitted from the light-emitting component through the front end surface of the transparent body forms a light collection area and the light emitted from the light-emitting component to the internal surface of the disc reflective structure is reflected by the internal surface to form an axial parallel light beam, which is collected in the light collection area.

With the light of the light-emitting component being reflected by the internal surface of the disc reflective structure and an axial even parallel light beam being produced and collected at the light collection area, the light interference can be reduced and the illumination can be improved so as to enhance the light sensing effect and reduce the cost and power consumption of the optical mouse.

To achieve the foregoing objective, the present invention provides an optical mouse light emitter, which comprises a transparent body, a divergent light-emitting component and a support base. The light-emitting component is built into the transparent body. The support base is built into the transparent body. The support base includes a support section and a disc reflective section. The support section is coupled to the lower edge of the disc reflective section and the upper edge of the disc reflective section forms an opening. The light-emitting component is disposed on the support section. The disc reflective section includes an internal surface facing the light-emitting component and the opening. The light emitted from the light-emitting component to the opening of the support base forms a light collection area and the light emitted from the light-emitting component to the internal surface of the disc reflective section is reflected by the internal surface to form an axial parallel light beam, which is collected in the light collection area.

With the internal surface of the disc reflective section reflecting the light of the light-emitting component to form an axial even parallel light beam, which is collected in the light collection area, the light interference can be reduced and the illumination can be improved so as to enhance the light sensing effect and reduce the cost and power consumption of the optical mouse.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
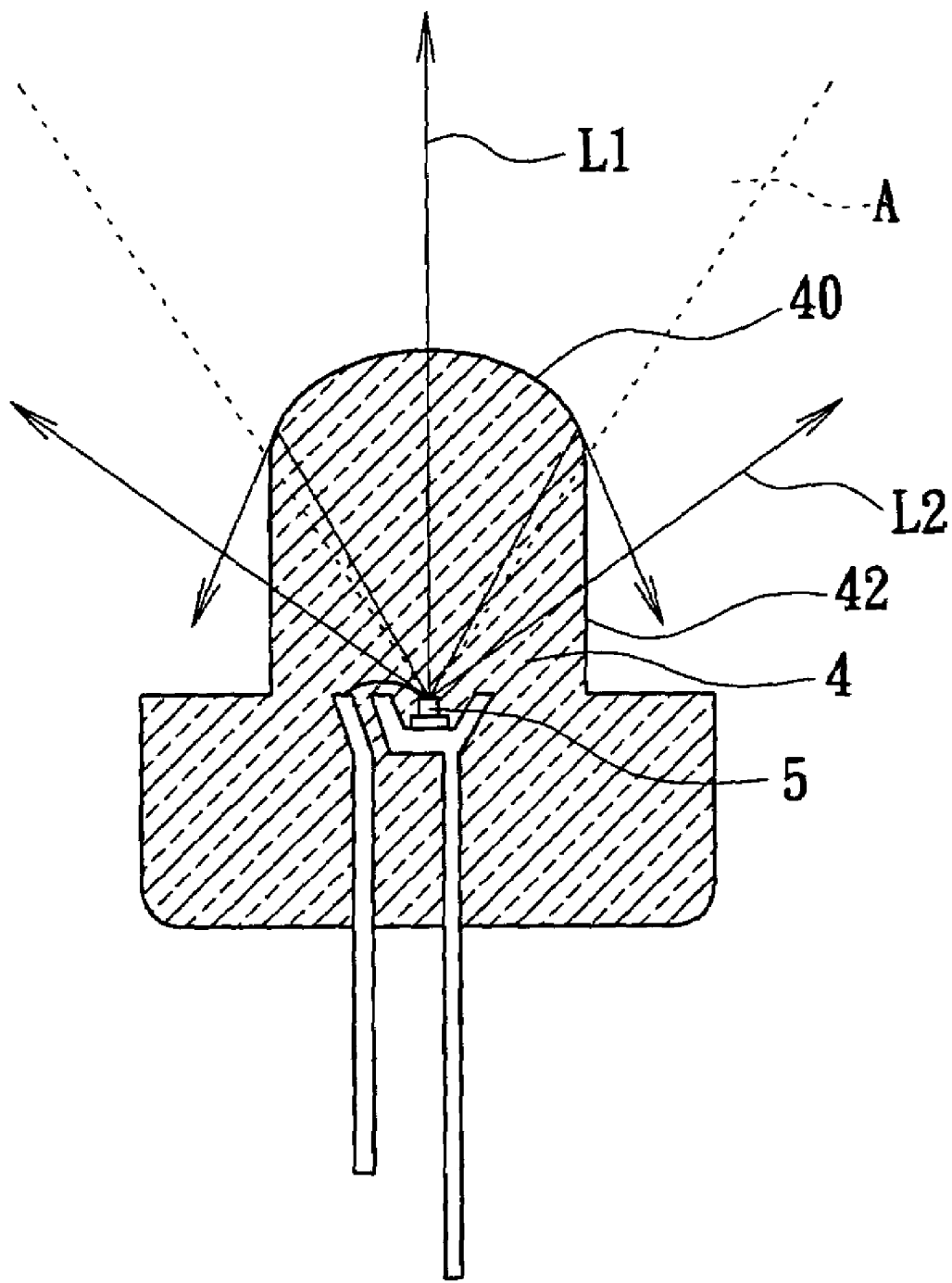
FIG. 1 is a schematic, cross-sectional view of an optical mouse light emitter according to a prior art.
Figure 2:
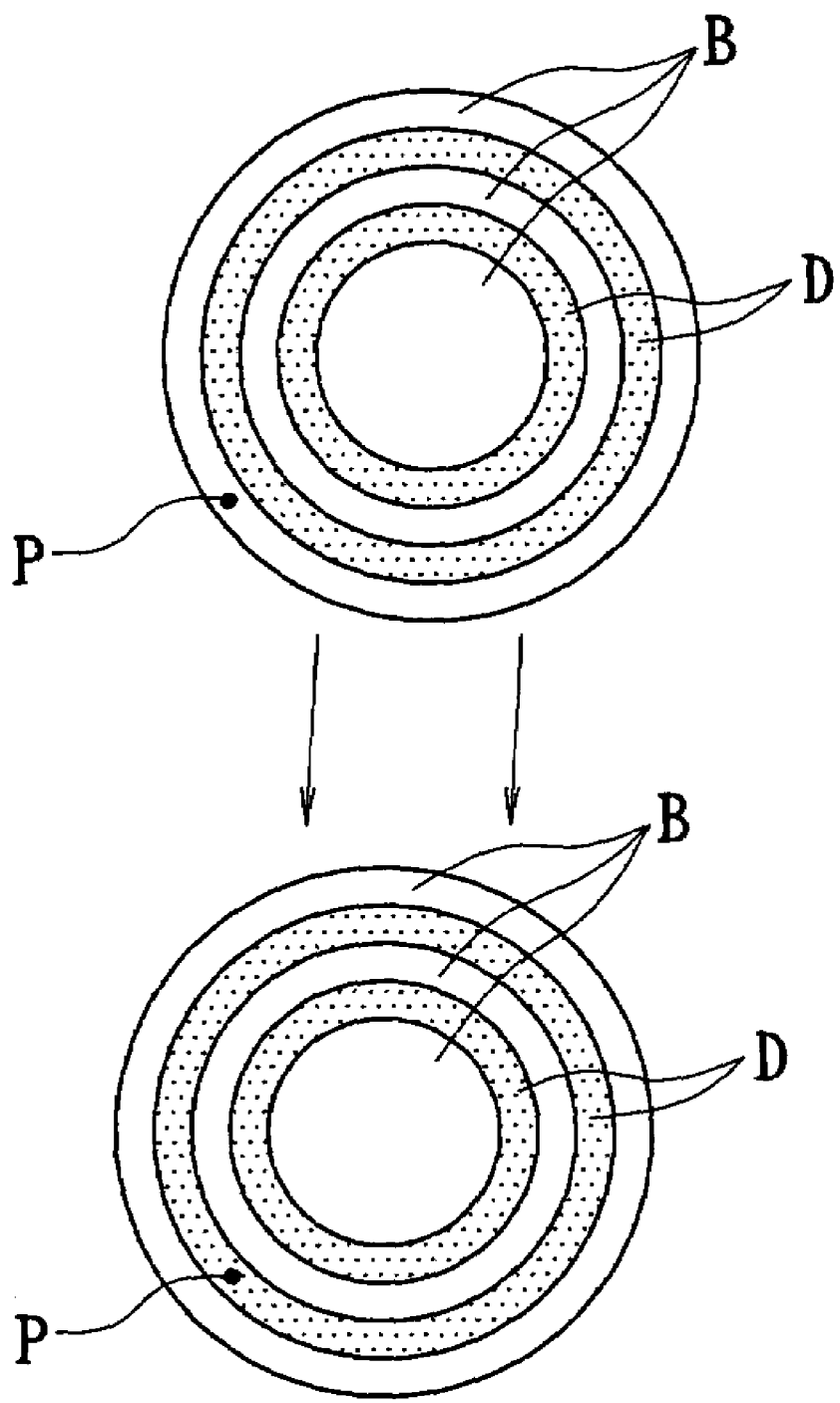
FIG. 2 is a schematic view of the light of the light-emitting component focusing on a flat surface of a desk to form a bright ring and a dark ring according to a prior-art optical mouse light emitter.
Figure 3:
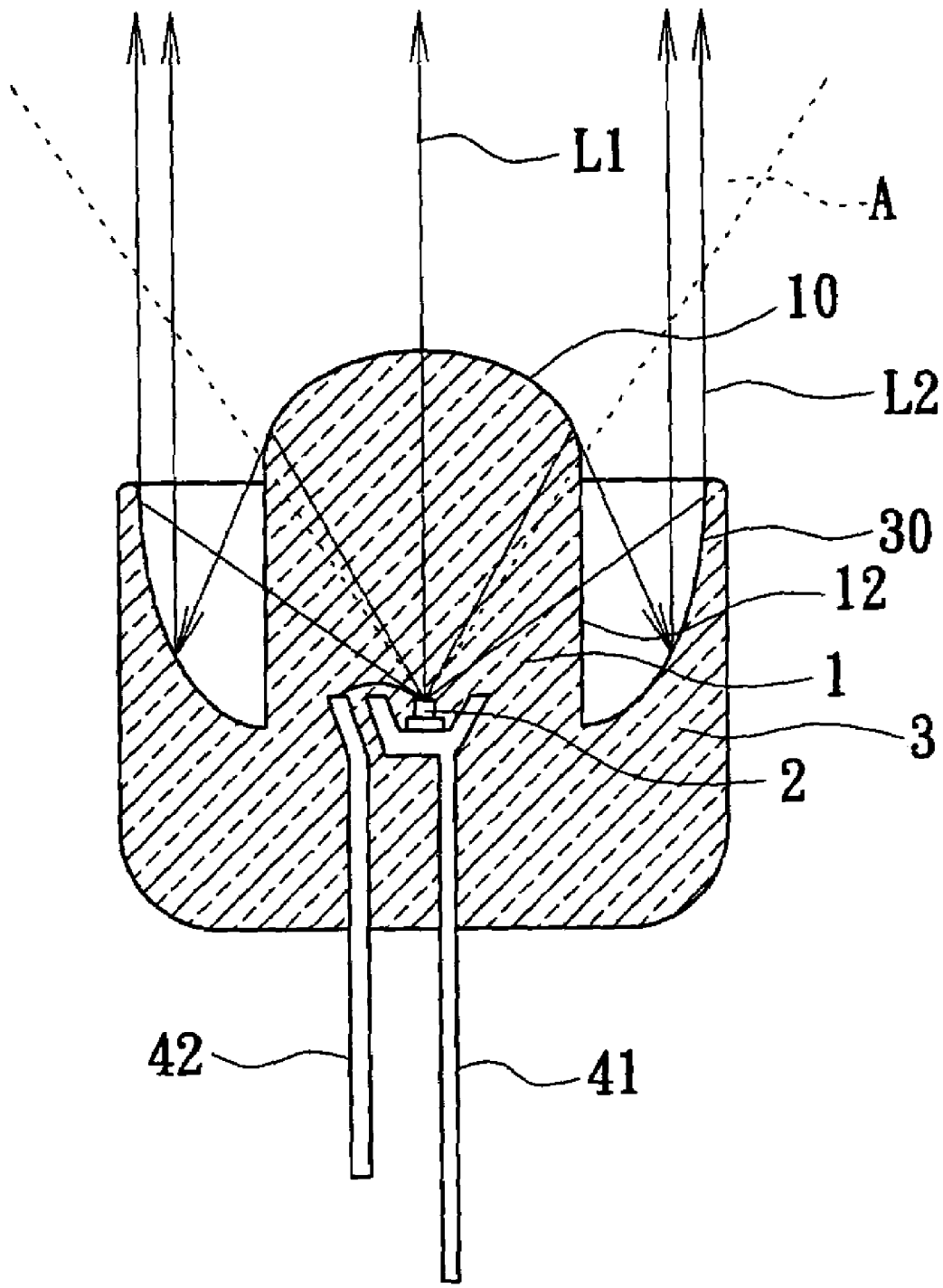
FIG. 3 is a schematic, cross-sectional view of an optical mouse light emitter according to a first preferred embodiment of the present invention.

Reference is made to FIG. 3 for a first preferred embodiment of the present invention. The invention is an optical mouse light emitter, which comprises a transparent body 1, a divergent light-emitting component 2 and a disc reflective structure 3. The transparent body 1 includes a curved front end surface 10 and a cylindrical lateral circular surface 12. The light-emitting component 2, such as a light emitting chip, is built into the transparent body 1. The disc reflective structure 3 is built on the lateral circular surface 12 of the transparent body 1. The disc reflective structure 3 includes an internal surface. The internal surface 30 faces the lateral circular surface 12 and the front end of the transparent body 1. The internal surface of the disc reflective structure 3 is substantially a paraboloid, an ellipsoid or a hyperboloid, and the disc reflective structure 3 is integrally formed in the transparent body 1.

The light emitter is built into an optical mouse. The optical mouse further includes an optical mechanism (such as an optical device and an optical grating), a sensor, a circuit unit and a power supply unit (such as a battery and a power connector) therein. As the optical mouse is moved on a flat surface of a desk, the light L1 emitted from the light-emitting component 2 through the front end 10 of the transparent body 1 forms a light collection area A, and the light L2 transmitted to the light-emitting component 2 to the internal surface 30 of the disc reflective structure 3 is reflected by the internal surface 30 to form an axial parallel light beam, which is collected in the light collection area A as to pass more light L1, L2 through the light collection area A. The light L1, L2 passing through the light collection area A is transmitted to the flat surface of a desk by a part of the optical mechanism of the optical mouse, and the light L1, L2 is diffused by the flat surface of a desk and reflected to another part of the optical mechanism, such that the light L1, L2 is focused at the sensor of the optical mouse, and the circuit unit of the optical mouse can compute the moving direction and displacement of the optical mouse. Compared with the prior-art optical mouse light emitter having a divergent light-emitting component, the light L1, L2 of the light-emitting component 2 of the optical mouse light emitter forms an even parallel light beam and has even illumination. Therefore, the light interference will become insignificant, and a stable potential will be produced after the sensor receives the light L1, L2 as to give a good optical sensing effect. The optical mouse cursor can be moved smoothly on the screen. Compared with the prior-art optical mouse light emitter having a laser component, the optical mouse light emitter of the present invention is cheaper. In addition, the optical mouse light, emitter of the present invention collects the light to avoid light diffusion, and thus can reduce the electric power consumption and extend the battery life.

Figure 4:
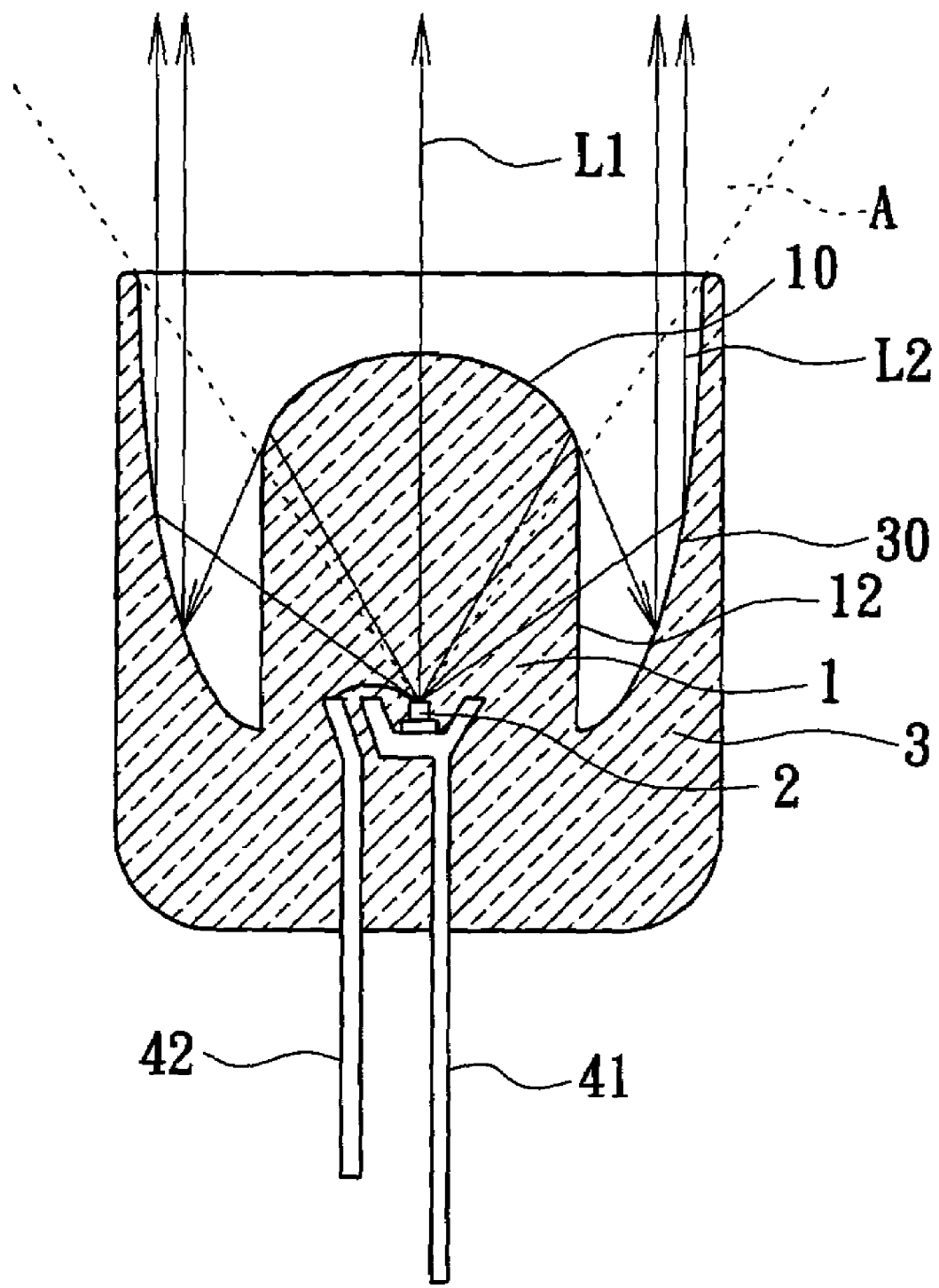
FIG. 4 is a schematic, cross-sectional view of an optical mouse light emitter according to a second preferred embodiment of the present invention.

Reference is made to FIG. 4 for a second preferred embodiment of the present invention. The major difference between the second preferred embodiment and the first preferred embodiment resides in the front edge of the front end surface of the transparent body 1 being extended from the internal surface 30 of the disc reflective structure 3 to improve a reflective effect thereof.

Figure 5:
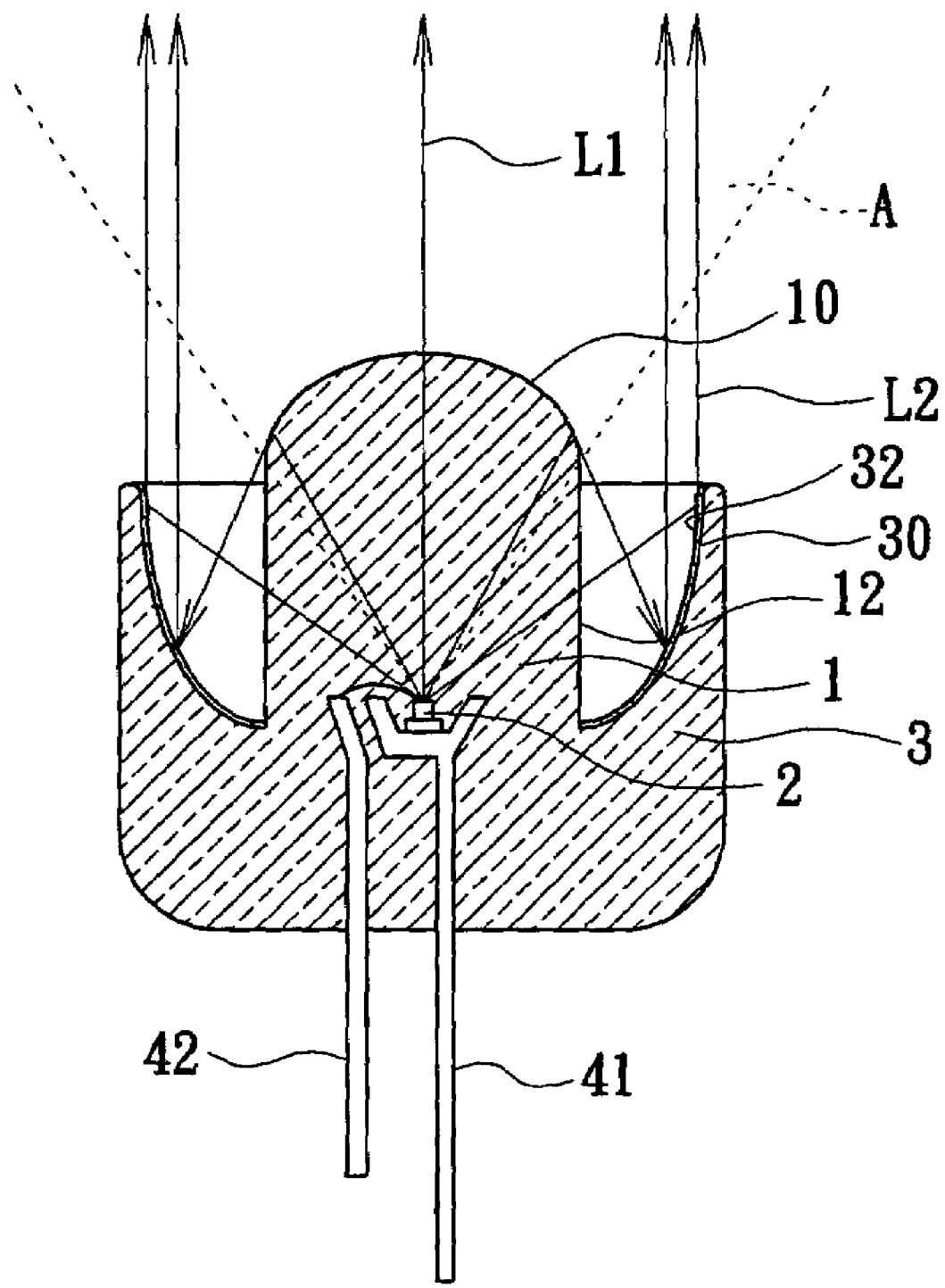
FIG. 5 is a schematic, cross-sectional view of an optical mouse light emitter according to a third preferred embodiment of the present invention.

Reference is made to FIG. 5 for a third preferred embodiment. The major difference between the third preferred embodiment and the first preferred embodiment resides in the disc reflective structure 3 having a reflective layer 32 disposed on its internal surface 30. The reflective layer 32 is coated or electroplated onto the internal surface 30 to improve a reflective effect thereof.

Figure 6:
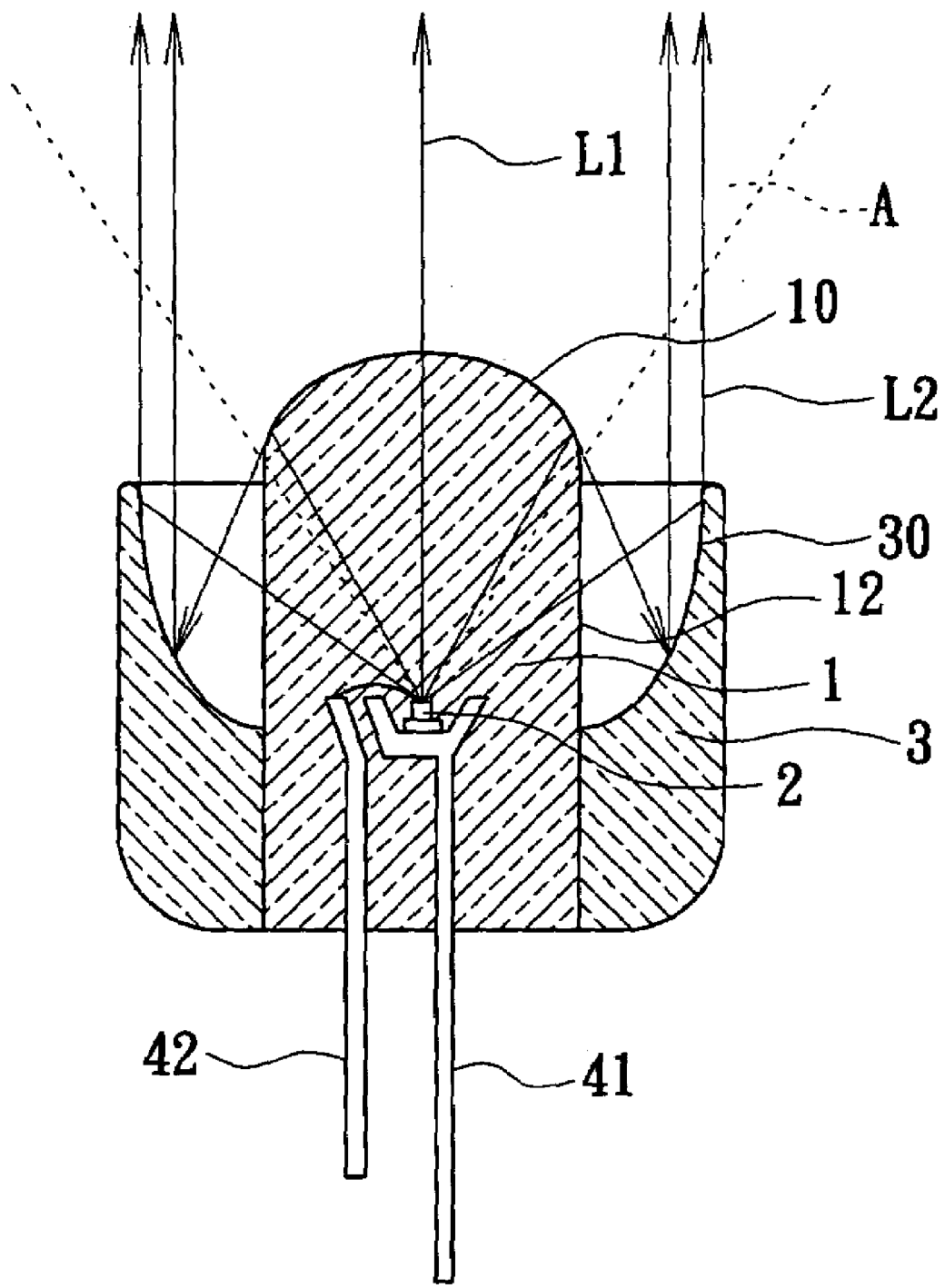
FIG. 6 is a schematic, cross-sectional view of an optical mouse light emitter according to a fourth preferred embodiment of the present invention.

Reference is made to FIG. 6 for a fourth preferred embodiment. The major difference between the fourth preferred embodiment and the first preferred embodiment resides in the disc reflective structure 3 being installed on the lateral circular surface 12 of the transparent body 1.

Figure 7:
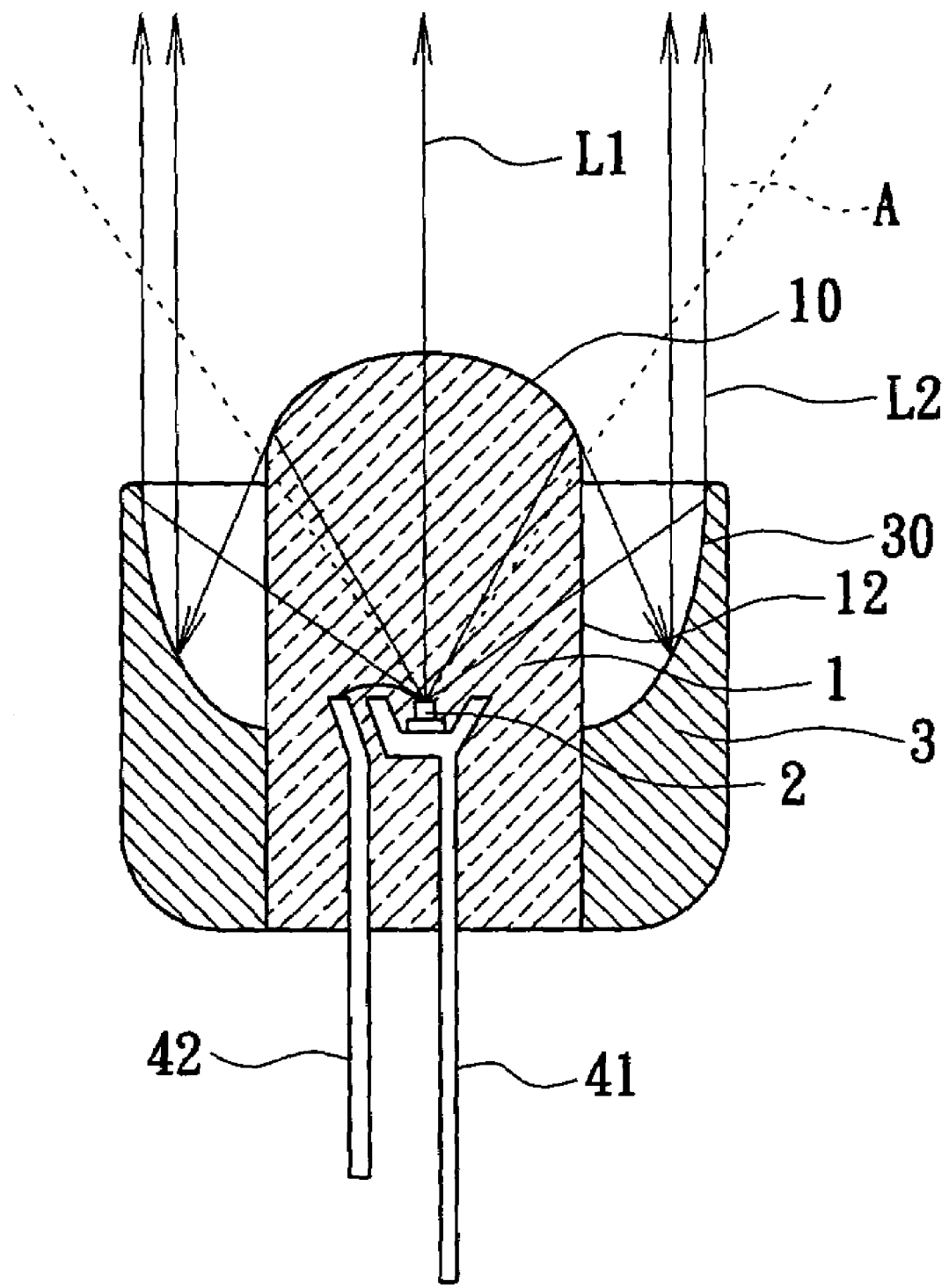
FIG. 7 is a schematic, cross-sectional view of an optical mouse light emitter according to a fifth preferred embodiment of the present invention.

Reference is made to FIG. 7 for a fifth preferred embodiment. The major difference between the fifth preferred embodiment and the first preferred embodiment resides in the disc reflective structure 3 being made of transparent or an opaque reflective materials.

Figure 8:
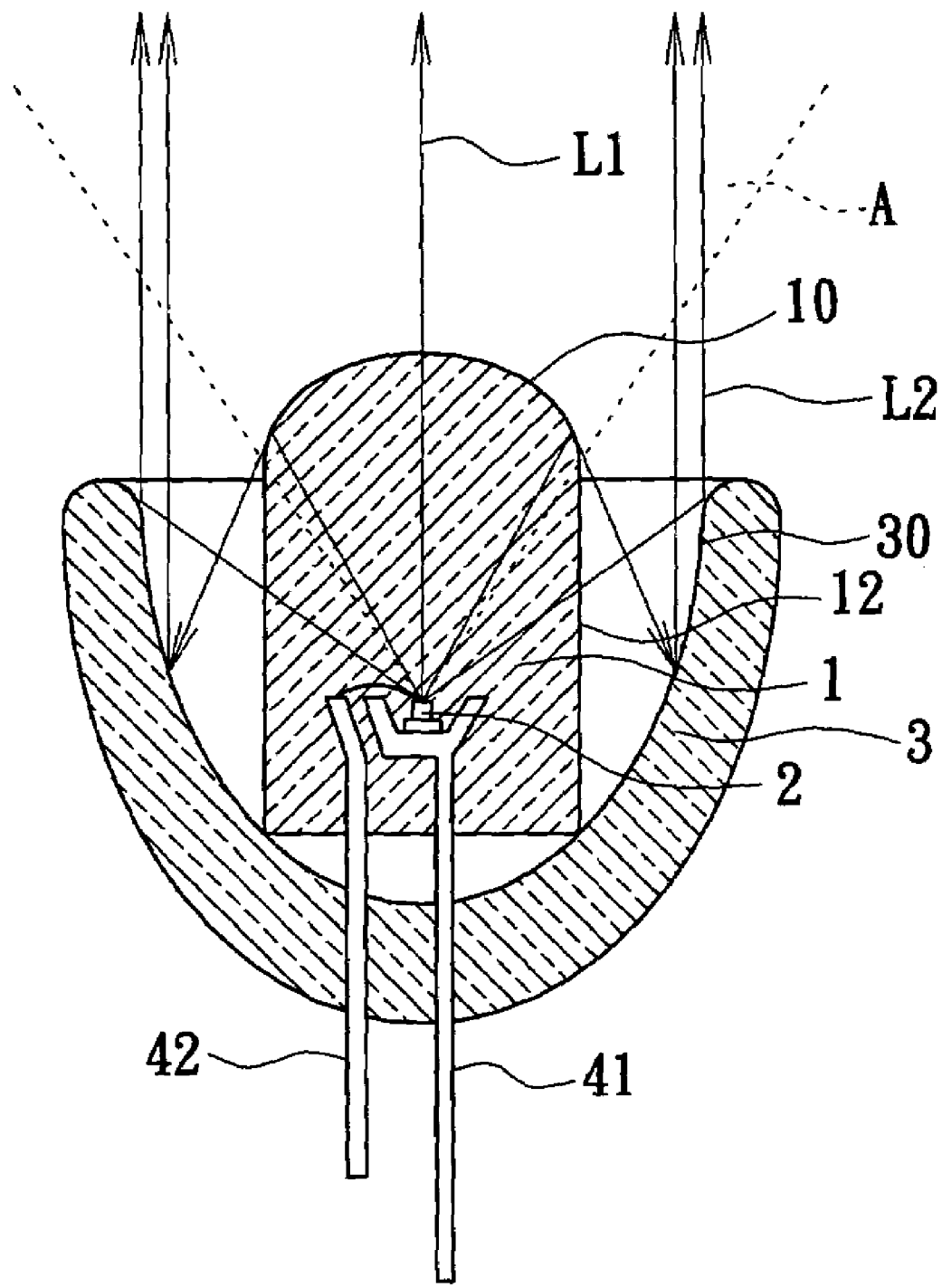
FIG. 8 is a schematic, cross-sectional view of an optical mouse light emitter according to a sixth preferred embodiment of the present invention.

Reference is made to FIG. 8 for a sixth preferred embodiment. The optical mouse light emitter of the present invention further comprises two pins 41, 42, and the disc reflective structure 3 is installed at the two pins 41, 42 and the internal surface 30 of the disc reflective structure 3 is substantially a full paraboloid for improving its reflective effect.

Figure 9:
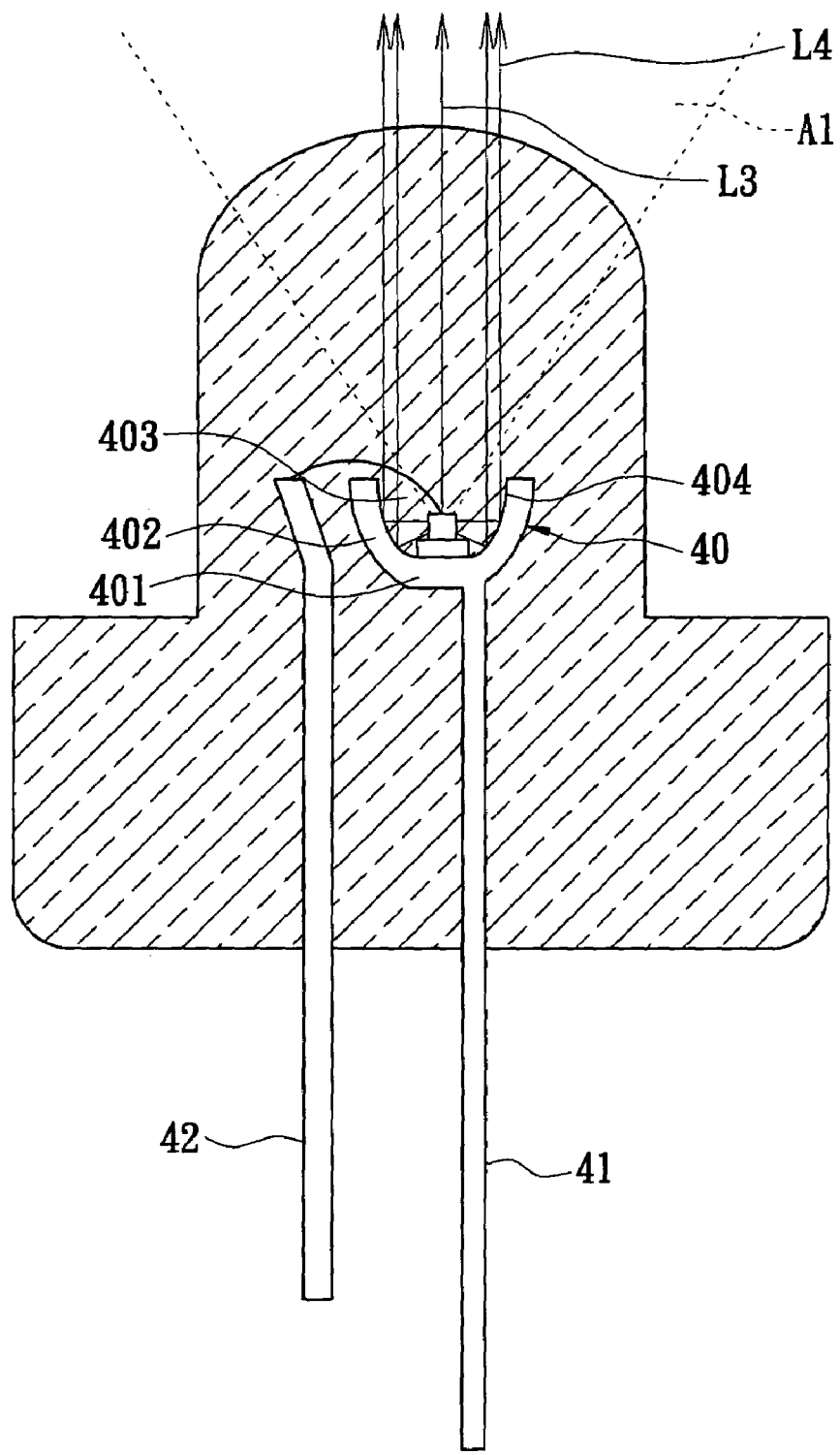
FIG. 9 is a schematic, cross-sectional view of an optical mouse light emitter according to a seventh preferred embodiment of the present invention.

Reference is made to FIG. 9 for the seventh preferred embodiment of the present invention. In the seventh preferred embodiment, the optical mouse light emitter of the present invention comprises a support base 40 being built in the transparent body 1 and coupled to one of the pins 41. The support base 4 includes a support section 401 and a disc reflective section. The support section 401 is coupled to the lower edge of the disc reflective section 402 and an opening 403 is formed at the upper edge of the disc reflective section 402.

The light-emitting component 2 is built onto the support section 401, and the disc reflective section 402 has an internal surface 404 facing the light-emitting component 2 and the opening 403. The internal surface 404 of the disc reflective section 402 is substantially a paraboloid, an ellipsoid or a hyperboloid. The light L3 emitted from the light-emitting component 2 to the opening 403 of the support base 40 forms a light collection area A1, and the light L4 emitted from the light-emitting component 2 to the internal surface 404 of the disc reflective section 402 is reflected by the internal surface 404 to form an axial parallel light beam which is collected in the light collection area A1. Therefore, the light L3, L4 of the light-emitting component 2 produces even parallel light beams.

Figure 10:
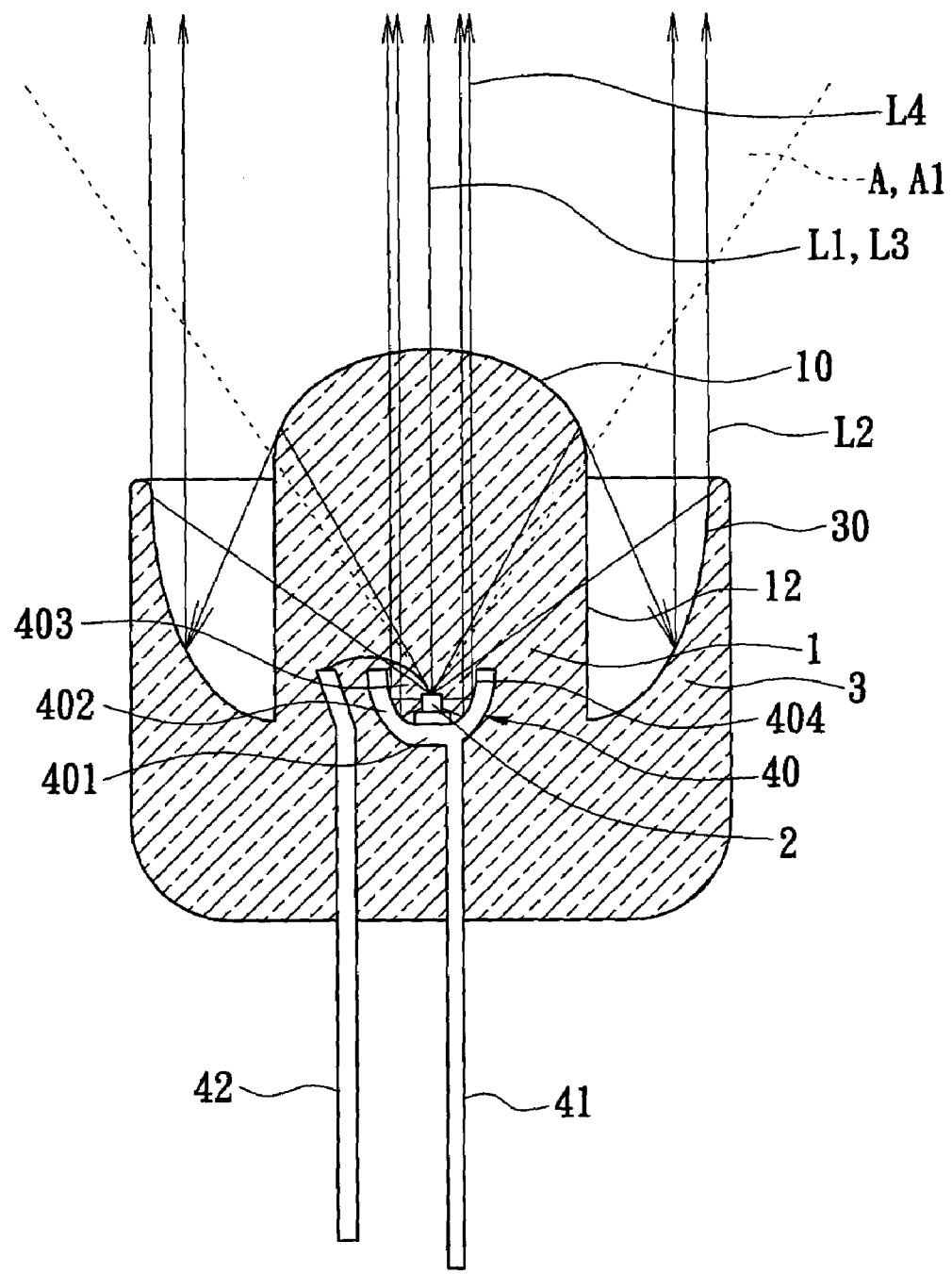
FIG. 10 is a schematic, cross-sectional view of an optical mouse light emitter according to an eighth preferred embodiment of the present invention.

Reference is made to FIG. 10 for the eighth preferred embodiment of the present invention. In the eighth preferred embodiment, the optical mouse light emitter of the present invention also includes the technical characteristics of the disc reflective structure 3 as disclosed in the first preferred embodiment and the disc reflective structure 3 having the support base 40 as disclosed in the seventh preferred embodiment. The optical mouse light emitter of the present invention concurrently has the disc reflective section 402 with the support base 40 and the disc reflective structure 3 as disclosed in any one of the first to the sixth preferred embodiments, such that the light of the light-emitting component 2 forms a more even parallel light beam for improving the optical sensing effect of the optical mouse.

The optical mouse light emitter of the present invention has the following advantages 1. The light of the light-emitting component is reflected from the internal surface of the disc reflective structure to form axial even parallel light beams, which are collected in the light collection area for reducing the light interference and improving the illumination so as to enhance the light sensing effect and reduce the cost and power consumption of the optical mouse.
2. The light of the light-emitting component is reflected from the internal surface of the disc reflective section to form axial even parallel light beams, which are collected in the light collection area for reducing the light interference and improving the illumination so as to enhance the light sensing effect and reduce the cost and power consumption of the optical mouse.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical mouse light emitter, comprising:
    a transparent body;
    a divergent light-emitting component, built in said transparent body; and
    a pair of pins built in said transparent body and electrically connected to said light emitting component, one of said pair of pins having a support base formed therein, said support base including a support section and a disc reflective section, said support section being coupled to a lower edge of said disc reflective section and an upper edge of said disc reflective section forming an opening, said light-emitting component being disposed on said support section and said disc reflective section having an internal surface facing said light-emitting component and said opening;
    wherein light emitted from said light-emitting component toward said opening of said support base forms a light collection area, and light emitted from said light-emitting component toward said internal surface of said disc reflective section is reflected by said internal surface to produce an axial parallel light beam, said axial parallel light beam being collected in said light collection area.

2. The optical mouse light emitter of claim 1, wherein said internal surface of said disc reflective section is substantially a paraboloid, an ellipsoid or a hyperboloid.

3. An optical mouse light emitter, comprising:
    a transparent body, said transparent body including a disc reflective structure, said transparent body having a front end surface and a lateral circular surface, said disc reflective structure being built on said lateral circular surface and includes an internal surface facing said lateral circular surface and the front end of said transparent body;
    a divergent light-emitting component, built in said transparent body, light emitted from said light-emitting component through said front end surface of said transparent body forming a light collection area, and light emitted from said light-emitting component to said internal surface of said disc reflective structure being reflected by said internal surface to form an axial parallel light beam, said axial parallel light beam is being collected in said light collection area, and said light collection area is being produced by light emitted from said light-emitting component through said front end surface of said transparent body; and
    a support base, built in said transparent body and having a support section and a disc reflective section, said support section being coupled to a lower edge of said disc reflective section, an upper edge of said disc reflective section forming an opening, said light-emitting component being disposed on said support section and said disc reflective section having an internal surface facing said light-emitting component and said opening;
    wherein light emitted from said light-emitting component to said opening of said support base is directed to said front end surface of said transparent body to be collected in said light collection area, and light emitted from said light-emitting component to said internal surface of said disc reflective section being reflected by said internal surface to produce axial parallel light beam, said axial parallel light beam being collected in said light collection area.

4. The optical mouse light emitter of claim 3, wherein said internal surface of said disc reflective structure and said internal surface of said disc reflective section are each respectively of one of substantially a paraboloid, an ellipsoid or a hyperboloid.

* * * * *

UNITED STATES PATENT AND TRADEMARK OFFICE
CERTIFICATE OF CORRECTION

| | | |
|---|---|---|
| PATENT NO. | : 7,616,189 B2 | Page 1 of 1 |
| APPLICATION NO. | : 11/033141 | |
| DATED | : November 10, 2009 | |
| INVENTOR(S) | : Shu-Feng Lu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1339 days.

Signed and Sealed this

Nineteenth Day of October, 2010

David J. Kappos
*Director of the United States Patent and Trademark Office*